(12) United States Patent
Chang et al.

(10) Patent No.: US 7,222,812 B2
(45) Date of Patent: May 29, 2007

(54) POSITIONING SHAFT OF A DUAL DIRECTION CABLE REEL

(76) Inventors: Wen-Han Chang, PO Box 82-144, Taipei (TW); Chih-Ming Lu, PO Box 82-144, Taipei (TW)

( * ) Notice: Subject to any disclaimer, the term of this patent is extended or adjusted under 35 U.S.C. 154(b) by 196 days.

(21) Appl. No.: 10/986,359

(22) Filed: Nov. 12, 2004

(65) Prior Publication Data

US 2006/0102766 A1    May 18, 2006

(51) Int. Cl.
  *B65H 75/48*    (2006.01)
(52) U.S. Cl. .................................. 242/378.1; 242/385.3
(58) Field of Classification Search ................ 242/378, 242/378.1, 385.3
  See application file for complete search history.

(56) References Cited

U.S. PATENT DOCUMENTS 6,019,304 A * 2/2000 Skowronski et al. ........ 242/373

2006/0011763 A1 * 1/2006 Kuo ......................... 242/378.1

* cited by examiner

*Primary Examiner*—William A. Rivera
*Assistant Examiner*—Sang Kim
(74) *Attorney, Agent, or Firm*—Leong C. Lei

(57) ABSTRACT

A positioning shaft of a dual direction cable reel is disclosed. The cable reel comprises an upper cover, a pad, a reeling disc, a coiled cable, a spring, and a lower cover, characterized in that the reeling disc and a positioning element mounted at the inner edge of the lower cover form an engaging and disengaging mechanism, wherein the positioning element includes a positioning shaft and a positioning plate and the positioning plate covers the top portion of the positioning shaft and is secured with a peg and the positioning plate has a pivot hole at the center thereof for the pivot mounting of the positioning shaft, and the front end of the positioning plate exposed from the shaft body of the positioning shaft is provided with a sliding protruded section corresponding to the railing slot at the bottom section of the reeling disc, and the bottom section is provided with an operation railing slot for the sliding protruded section to rotate along the reeling slot so as to provide an alternating engaging and a disengaging action.

1 Claim, 5 Drawing Sheets

POSITIONING SHAFT OF A DUAL DIRECTION CABLE REEL

BACKGROUND OF THE INVENTION (a) Technical Field of the Invention

The present invention relates to a cable reel, and in particular, to a positioning shaft of a dual direction cable reel.

(b) Description of the Prior Art

The conventional cable reel employs a steel bead to position a coiled cable on a cable reel and FIGS. 6 and 7 show such a conventional cable reel structure. The reel structure A10 includes a front cover A1, a spring A2, sliding seat A3, a transmission cable A4, a positioning bead A5 and a rear cover A6. The spring A2 is positioned within the sliding seat A3 which is the source of power to reel the transmission cable A4. However, the bead A5 for positioning is by sliding and therefore the bottom section of the sliding seat A3 is provided with a rail A3 allowing the bead A5 to be in the rail A3. However, the bead A5 causes noise. Therefore, it is an object of the present invention to provide a positioning shaft of a dual direction cable reel which mitigates the above drawback.

SUMMARY OF THE INVENTION

Accordingly, it is an object of the present invention to provide a positioning shaft of a dual direction cable reel having an upper cover, a pad, a reeling disc, a coiled cable, a spring, and a lower cover, characterized in that the reeling disc and a positioning element mounted at the inner edge of the lower cover form an engaging and disengaging mechanism, wherein the positioning element includes a positioning shaft and a positioning plate and the positioning plate covers the top portion of the positioning shaft and is secured with a peg and the positioning plate has a pivot hole at the center thereof for the pivot mounting of the positioning shaft, and the front end of the positioning plate exposed from the shaft body of the positioning shaft is provided with a sliding protruded section corresponding to the railing slot at the bottom section of the reeling disc, and the bottom section is provided with an operation railing slot for the sliding protruded section to rotate along the reeling slot so as to provide an alternating engaging and a disengaging action.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
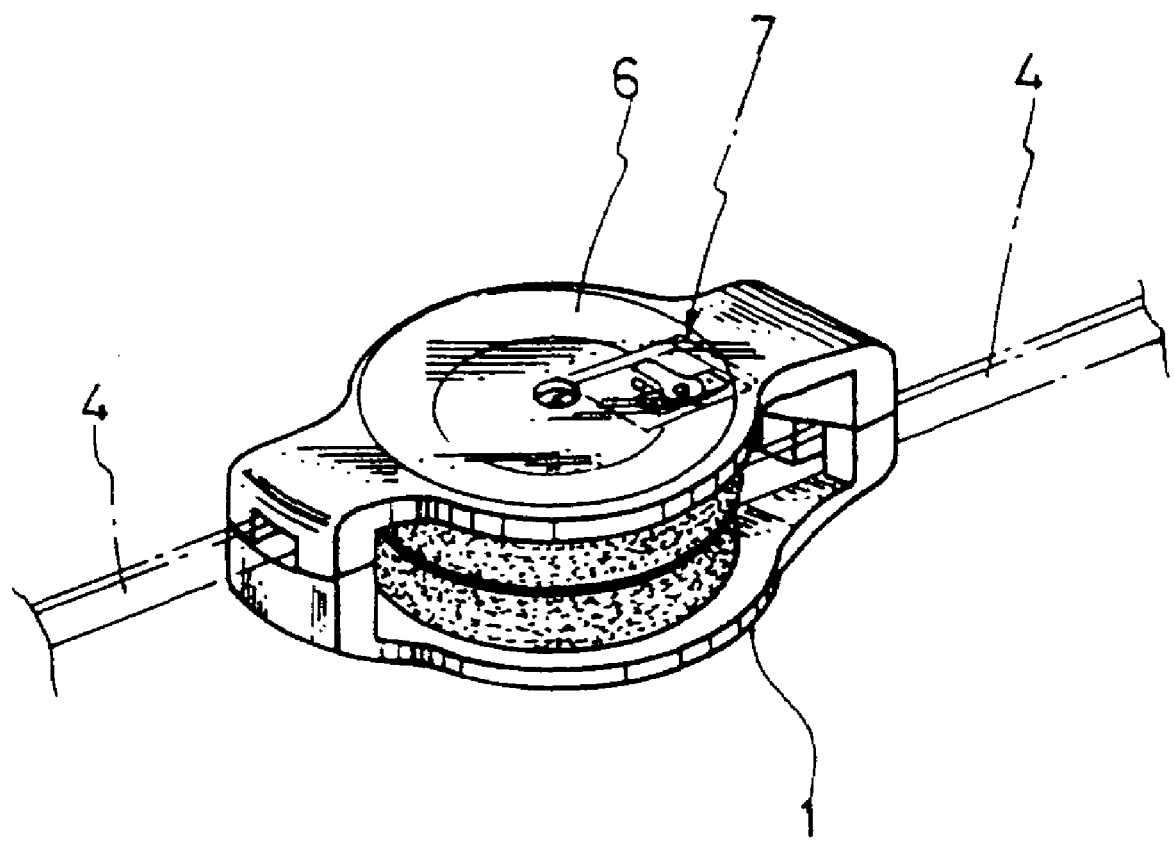
FIG. 1 is a perspective view of the preferred embodiment of the present invention.
Figure 2:
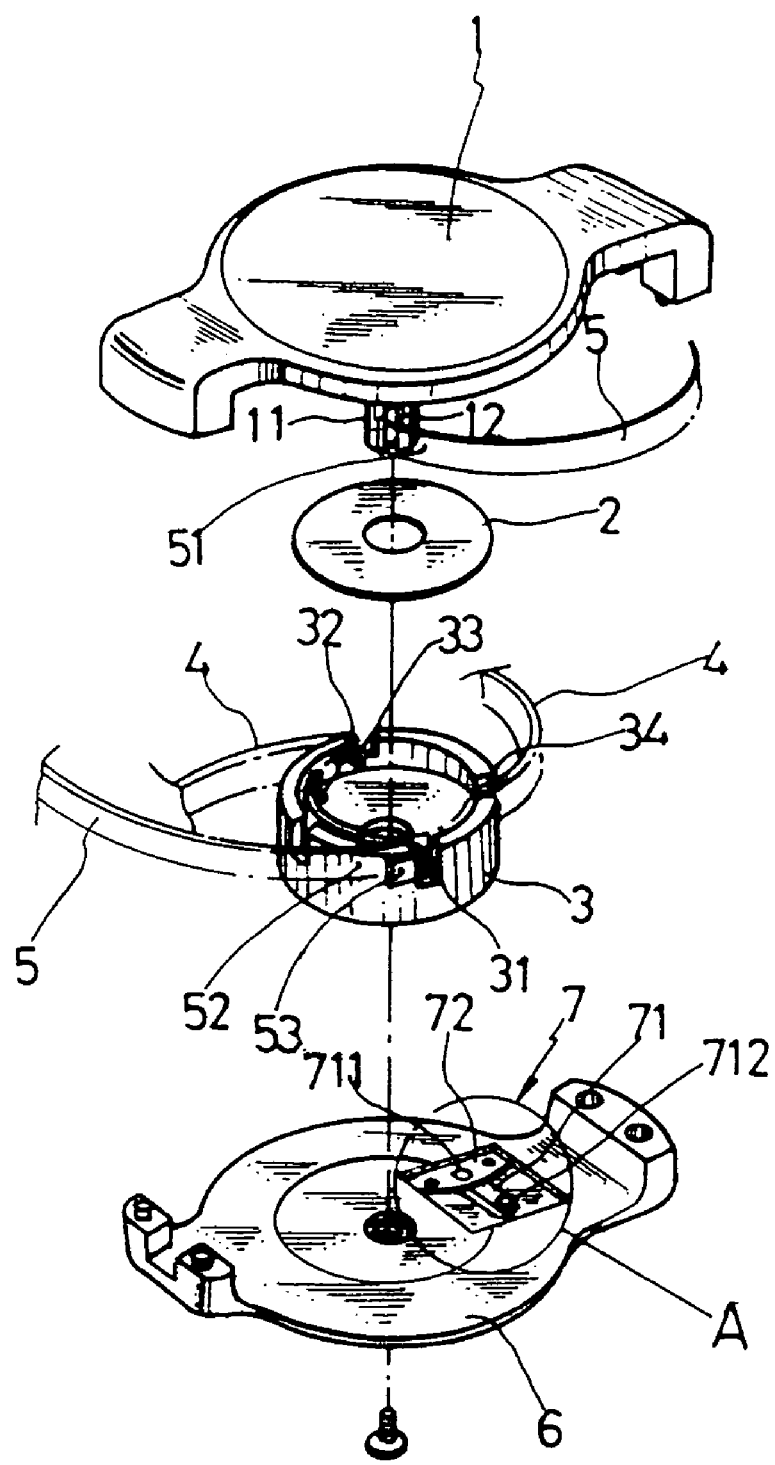
FIG. 2 is an exploded view of the positioning shaft of a dual direction cable reel of the present invention.

Referring to FIGS. 1 and 2, the cable reel of the present invention includes an upper cover 1, a pad 2, a reeling disc 3, a coiled cable 4, a spring 5, a lower cover 6, and a positioning member 7. The inner end 51 of the spring 5 is connected to the engaging slot 12 provided at the center shaft 11 of the upper cover 1, and the outer end 52 of the spring 5 has a hook 53 engaged with the engaging slot 31 of the reeling disc 3. When the reeling disc 3 rotates clockwise or anti-clockwise, the spring 5 becomes either tauted or in loosen condition, and the tauting of the spring provides the power for cable restoration of the cable reel.

The edge wall of the reeling disc 3 is provided with a clipping plate 32 which can guide one end of the coiled cable 4 out from the clipping hole 33. The other end of the coiled cable 4 is guided out of a corresponding slit 34 of the reeling disc 3 so that equal length coiled cable 4 surrounds the upper and lower frame position at the outer edge of the reeling disc 3. When the coiled cable 4 is pulled from dual direction, the coiled cable is pulled at the same time with the same speed, and another pulling of the coiled cable 4 will be restored to its original position.

Figure 3:
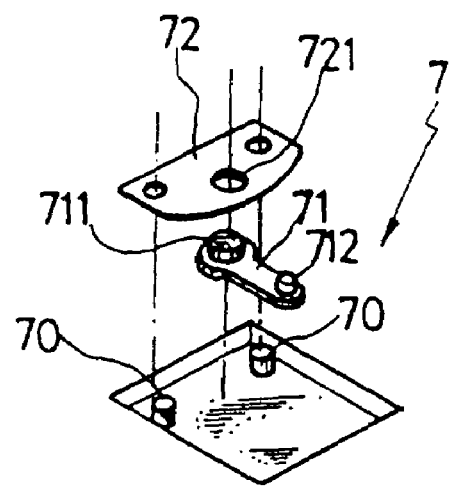
FIG. 3 is an exploded view of the positioning shaft of the present invention.

In accordance with the present invention, the reeling disc 3 and the positioning member 7 at the inner edge of the lower cover 6 form an engaging and disengaging mechanism. As shown in FIG. 3, the positioning member 7 includes a positioning shaft 71 and a positioning plate 72, and the positioning plate 72 covers the top section of the positioning shaft 71, and the two sides thereof is secured with a peg 70. The positioning plate 72 has a center pivot hole 721 for pivotal mounting of a pivot 711 on the positioning shaft 71 so that the positioning shaft 71 forms into a pivotal structure with the positioning plate 72. Additionally, the front end of the exposed positioning plate 72 is provided with a sliding protruded section 712 engaged the railing slot 35 at the bottom section of the reeling disc 3.

Figure 4:
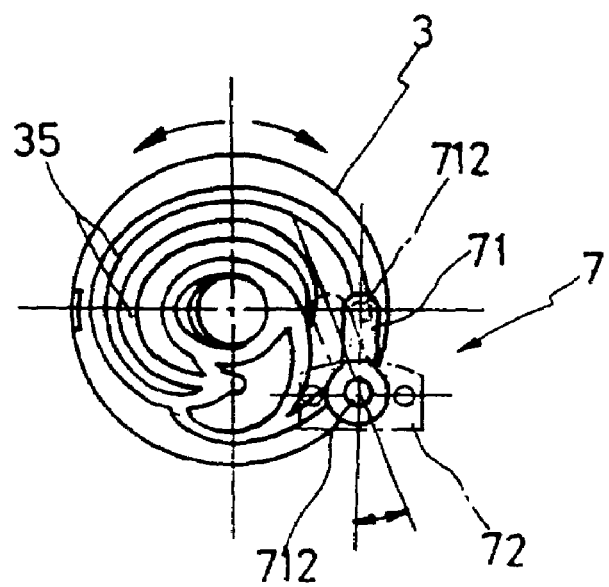
FIG. 4 is a schematic view showing the action of the positioning shaft with respect to the railing slot of the present invention.
Figure 5:
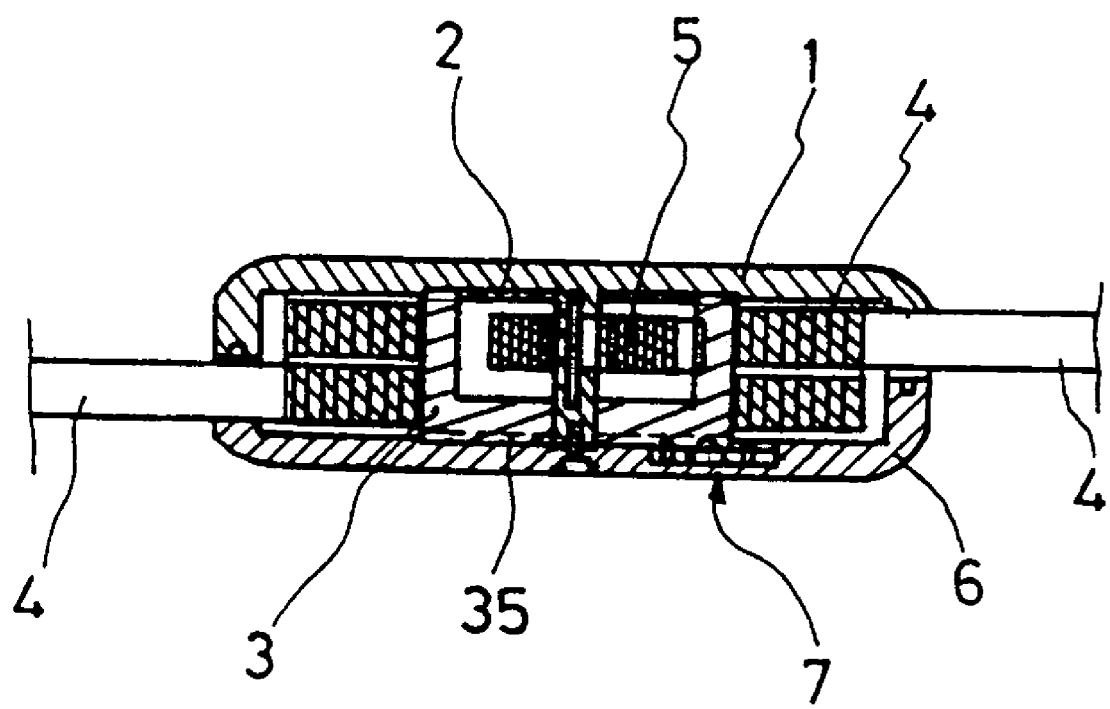
FIG. 5 is a sectional view of the positioning shaft of a dual direction cable reel of the present invention.
Figure 6:
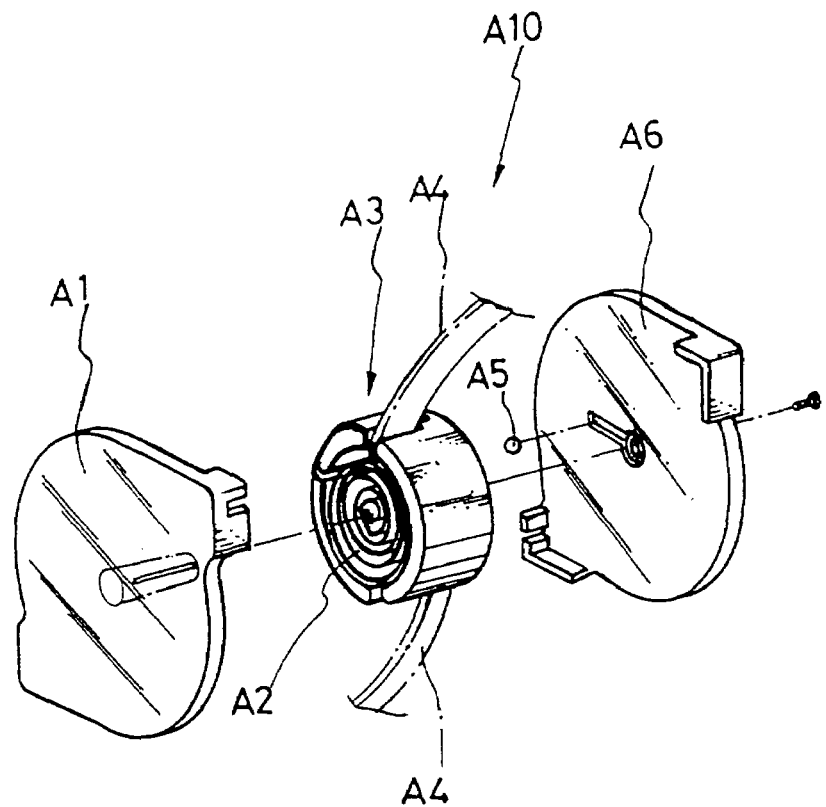
FIG. 6 is an exploded view of a conventional cable reel.
Figure 7:
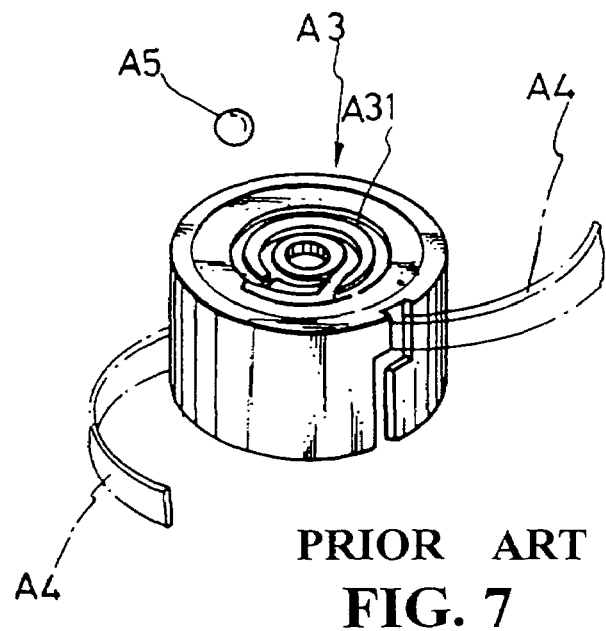
FIG. 7 is a schematic view showing the bottom section of the sliding seat of the cable reel.

As shown in FIGS. 4 and 5, the bottom section of the reeling disc 3 is provided with an operational railing slot 35 and the positioning shaft 71 provides an alternating engaging and disengaging action based on the rotating of the railing slot 35. Thus, when the coiled cable 4 is pulled, and the reeling disc 3 is rotating, the positioning shaft 71 together with the operational railing slot 35 forms into a swinging action. This swinging operation retracts the coiled cable 4 and then keeps the cable 4 in position. Another retracting of the coiled cable 4 causes the positioning shaft 71 to disengage. Another subsequent positioning is that after the positioning of the coiled cable 4, before the coiled cable 4 has fully retracted, another retraction of the coiled cable will cause the positioning shaft 71 to proceed to an engagement. Accordingly, the positioning shaft of a dual direction cable reel of the present invention provides a one-time reeling and multiple stage reeling of coiled cable positioning control.

While the invention has been described with respect to preferred embodiments, it will be clear to those skilled in the art that modifications and improvements may be made to the invention without departing from the spirit and scope of the invention. Therefore, the invention is not to be limited by the specific illustrative embodiment, but only by the scope of the appended claims.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. A dual direction cable reel comprising:
   an upper cover having a center shaft, said center shaft having an engaging slot;
   a lower cover engaged with said upper cover;
   a reeling disc having a winding surface, said winding surface having an engaging slot, a clipping hole, and a slit being circumferentially spaced from each other, an inner surface of the reeling disc having an edge wall, said edge wall being provided with a clipping plate for guiding an end of a coiled cable out of said clipping hole, said reeling disc having a bottom section formed with a railing slot;
   said coiled cable having a first end and a second end, said first end being guided out of said clipping hole by said clipping plate, said second end being guided out of said slit by said clipping plate;
   a spring having an inner end connected to said engaging slot of said center shaft of said upper cover, an outer end of said spring having a hook engaged with said engaging slot of said reeling disc
   a pad mounted on said center shaft of said upper cover; and
   a positioning member including a positioning shaft and a positioning plate, said positioning plate covering a top section of said positioning shaft, said positioning shaft having an end provided with a pivot and another end provided with a sliding protruded section, said sliding protruded section being engaged with said railing slot of said reeling disc, two sides of said positioning plate being secured to an inner side of said lower cover by two pegs, said positioning plate having a center pivot hole in which is pivotally mounted said pivot of said positioning shaft.

* * * * *